US008328606B2

(12) United States Patent
Benkert et al.

(10) Patent No.: US 8,328,606 B2
(45) Date of Patent: Dec. 11, 2012

(54) ANEROID REPLACEMENT

(75) Inventors: Ed Benkert, Tucson, AZ (US); Rich Morey, Morristown, NJ (US); Duane Inscho, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 946 days.

(21) Appl. No.: 12/401,477

(22) Filed: Mar. 10, 2009
(Under 37 CFR 1.47)

(65) Prior Publication Data
US 2010/0233950 A1    Sep. 16, 2010

(51) Int. Cl.
*B64D 13/02* (2006.01)
(52) U.S. Cl. .......................................... 454/74; 340/977
(58) Field of Classification Search .................... 454/70, 454/71, 72, 74, 76, 77; 340/945, 963, 970, 340/977; 137/557; 244/129.1, 129.4
See application file for complete search history.

(56) References Cited

U.S. PATENT DOCUMENTS

| 4,164,895 | A | * | 8/1979 | Aldrich et al. ................... 454/72 |
| 4,164,898 | A | * | 8/1979 | Burgess et al. .................. 454/72 |
| 5,934,614 | A | * | 8/1999 | Mueller et al. ................... 454/76 |
| 6,115,654 | A | * | 9/2000 | Eid et al. ......................... 244/1 R |
| 6,676,504 | B2 | * | 1/2004 | Petri et al. ........................ 454/74 |
| 6,737,988 | B2 | | 5/2004 | Horner et al. |
| 7,008,314 | B2 | | 3/2006 | Horner et al. |

\* cited by examiner

*Primary Examiner* — Eric Keasel
(74) *Attorney, Agent, or Firm* — Shimokaji & Assoc., PC

(57) ABSTRACT

An altitude switch limit assembly has two independent limit switches to monitor cabin pressure and back up performance of the auto and monitor channels on the aircraft. The auto channel closes a first switch upon sensing that a cabin pressure falls below a set value, the monitor channel closes a second switch upon sensing that the cabin pressure falls below the set value. A first independent limit switch may be wired to the auto channel and a second independent limit switch may be wired to the monitor channel. Logic circuitry may determine that the assembly closes an outflow valve regulating cabin pressure when either both independent limit switches sense the condition, or when one of the independent limit switch senses the condition and either the auto channel or monitor channel to which that independent limit switch may be wired senses the same condition.

19 Claims, 3 Drawing Sheets

ANEROID REPLACEMENT

BACKGROUND OF THE INVENTION

The present invention generally relates to apparatus and methods for replacing mechanical aneroid barometers and, more particularly, to apparatus and methods of replacing mechanical aneroid barometers with sensors and a unique logic function.

In aircraft, cabin pressure is a fail safe critical system. If the system fails, people die. There is a constant inflow of air into the cabin. The outflow of that air is regulated by an outflow valve, the result of which is a regulation of cabin pressure. If the outflow valve were to fail/shut the air would accumulate and cabin pressure would be too high with the result that the cabin would puff up like a balloon. Conversely, if the outflow valve were to fail/open, there would be too little pressure in the cabin with the result that the cabin would decompress. The input information that governs whether the outflow valve should be closed or not is a reading of the existing cabin pressure. This job is performed by an auto channel controller, or by a monitor limit switch. Both may contain electronic pressure sensors that operate independently to monitor cabin pressure independently of one another.

In order to provide redundancy and back up for the fail safe critical system of cabin pressure, an aircraft cabin pressure control system may also include a mechanical aneroid switch, which serves to provide back up for the auto channel and monitor controllers. If cabin pressure is determined to be too low as measured by either of these two pressure sensors, or by the aneroid switch, then a relay called an altitude limit relay gets energized (a solenoid is turned on) and a switch is closed resulting in the outflow valve being closed.

In certain aircraft, such as the Gulfstream 150, the aneroid switch that provides redundancy for the auto channel and monitor limit controllers has not kept the failure rate of the cabin pressure system low enough.

As can be seen, there is a need for an apparatus and method that ensures that the altitude limit relay does not incorrectly activate at an unacceptable rate of failure and that the critical fail safe cabin pressure system does not fail.

SUMMARY OF THE PRESENT INVENTION

In one aspect of the present invention, there is presented an assembly for detecting unacceptably low cabin pressure, comprising an auto channel controller that closes a first switch upon sensing that a cabin pressure falls below a set value; a monitor controller that closes a second switch upon sensing that the cabin pressure falls below the set value; a first independent limit switch wired to the auto channel limit switch; a second independent limit switch wired to the monitor limit switch, wherein the assembly closes an outflow valve, the outflow valve regulating cabin pressure when either (i) both the first independent limit switch and the second independent limit switch sense that the cabin pressure falls below the set value, or (ii) the first independent limit switch senses that the cabin pressure falls below the set value and the auto channel controller senses that the cabin pressure falls below the set value, or (iii) the second independent limit switch senses that the cabin pressure falls below the set value and the monitor controller senses that the cabin pressure falls below the set value.

In another aspect of the present invention, a method of monitoring a fail safe critical condition comprises electronically sensing the condition using an auto channel; electronically sensing the condition using a monitor channel; electronically sensing the condition by means of a first independent limit switch electronically connected to the auto channel; electronically sensing the condition by means of a second independent limit switch electronically connected to the monitor channel, wherein a relay is energized when either (i) both the first independent limit switch and the second independent limit switch sense that the condition reaches the set value, or (ii) the first independent limit switch senses that the condition reaches the set value and the auto channel senses that the condition reaches the set value, or (iii) the second independent limit switch senses that the condition reaches the set value and the monitor channel senses that the conditions reaches the set value.

According to a further aspect of the present invention, a cabin altitude limit switch assembly comprises a first independent limit switch wired to one of either an auto channel or a monitor channel, the auto channel closing a first switch upon sensing that the cabin altitude exceeds a set value and the monitor channel closing a second switch upon sensing that the altitude exceeds the set value; a second independent limit switch wired to a different one of either the auto channel or the monitor channel, wherein the assembly energizes an altitude limit relay when both the first independent limit switch and the second independent limit switch sense that the altitude exceeds the set value, and wherein the assembly energizes the relay when one of the independent limit switches senses that the altitude exceeds the set value and either (i) the auto channel wired to that one of the independent limit switches senses that the altitude exceeds the set value or (ii) the monitor channel wired to that one of the independent limit switches senses that the altitude exceeds the set value.

This and other features, aspects and advantages of the present invention will become better understood with reference to the following drawings, descriptions and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides an altitude limit switch assembly for monitoring the cabin pressure and altitude in an aircraft, such as the Gulfstream G150, G200 and P30. The assembly includes a first independent limit switch and a second independent switch. First and second independent limit switches are pressure sensors that electronically detect the cabin pressure in an aircraft and produce both analog and discrete output signals. The analog output signals of the two limit switches may be fed into a microprocessor in parallel with the digital sensor output of the auto and monitor channels. Circuitry associated with the assembly fixes the assembly output based on a logic function of the outputs of the four limit switches so as to have the independent limit switches continuously monitors cabin pressure.

In contrast to the prior art, which may use a mechanical aneroid barometer to back-up the performance of the auto and monitor channels in monitoring cabin pressure, the assembly of the present invention may have no aneroid barometer at all. In further contrast to the prior art, in which the failure rate may be unacceptable, the probability of failure of the assembly of the present invention may be more favorable, such that the assembly is expected to fail less frequently than the life of the aircraft. In contrast to the prior art, in which component reliability of the assembly may be based on a single limit switch, the assembly of the present invention may utilize two independent limit switches which may be of dissimilar design from the auto channel and monitor limit switches. In still further contrast to the prior art, in which cabin pressure may be monitored without the logic function of the present invention, the assembly of the present invention may be based on either of three events occurring: that both the first independent limit switch and the second independent limit switch sense the condition reaching the set value, that the first independent limit switch and the auto channel sense that the condition reaches the set value, and that the second independent limit switch and the monitor channel sense that the condition reaches the set value.

Figure 1:
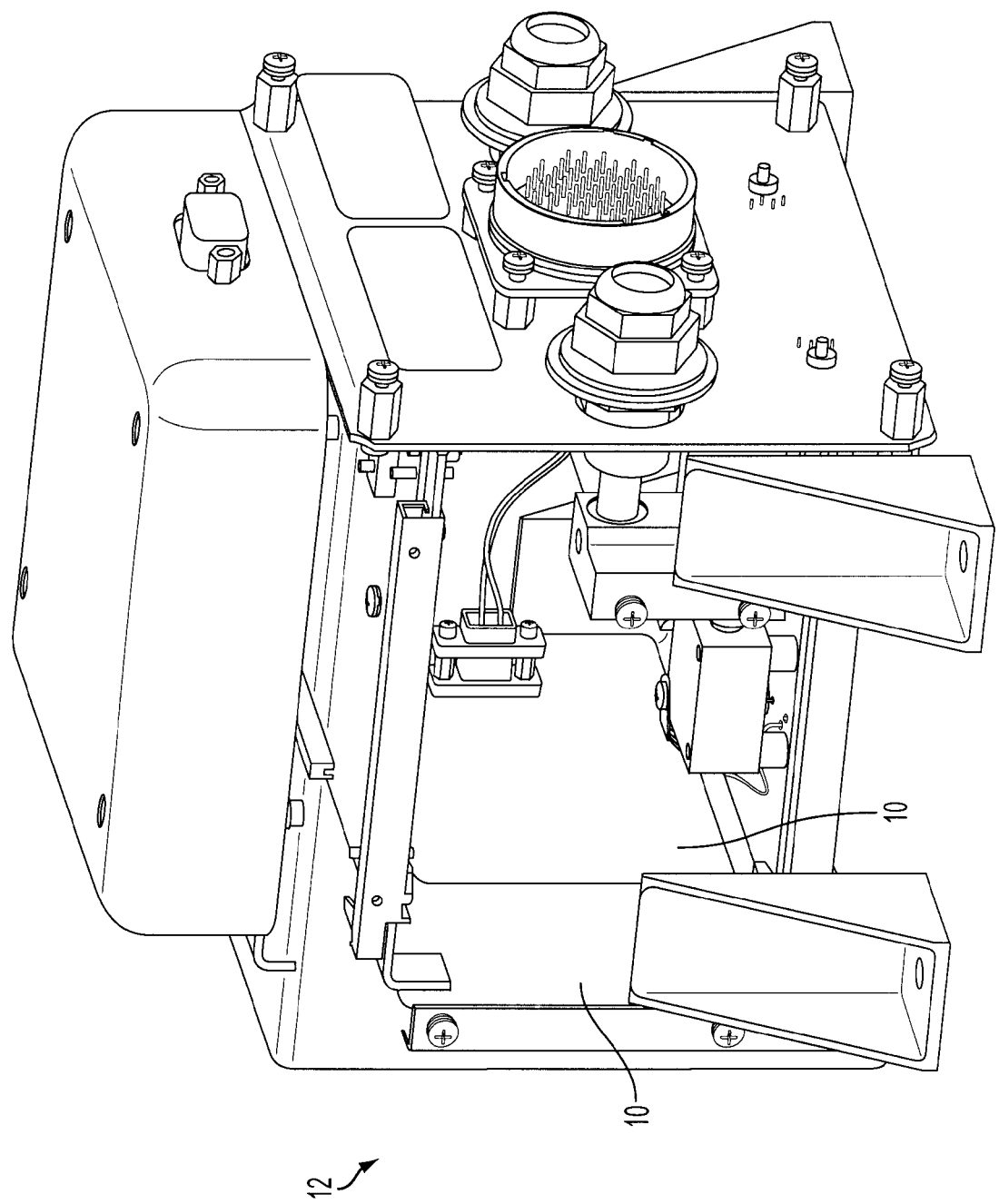
FIG. 1 is a perspective view of an altitude limit switch assembly mounted in assembled condition, in accordance with the present invention.

As seen from FIG. 1, an altitude limit switch assembly 10 may be mounted as a small black box into the cabin pressure control system 12 of an aircraft. The actual assembly 10 may be no more than 0.34 pounds.

Figure 2:
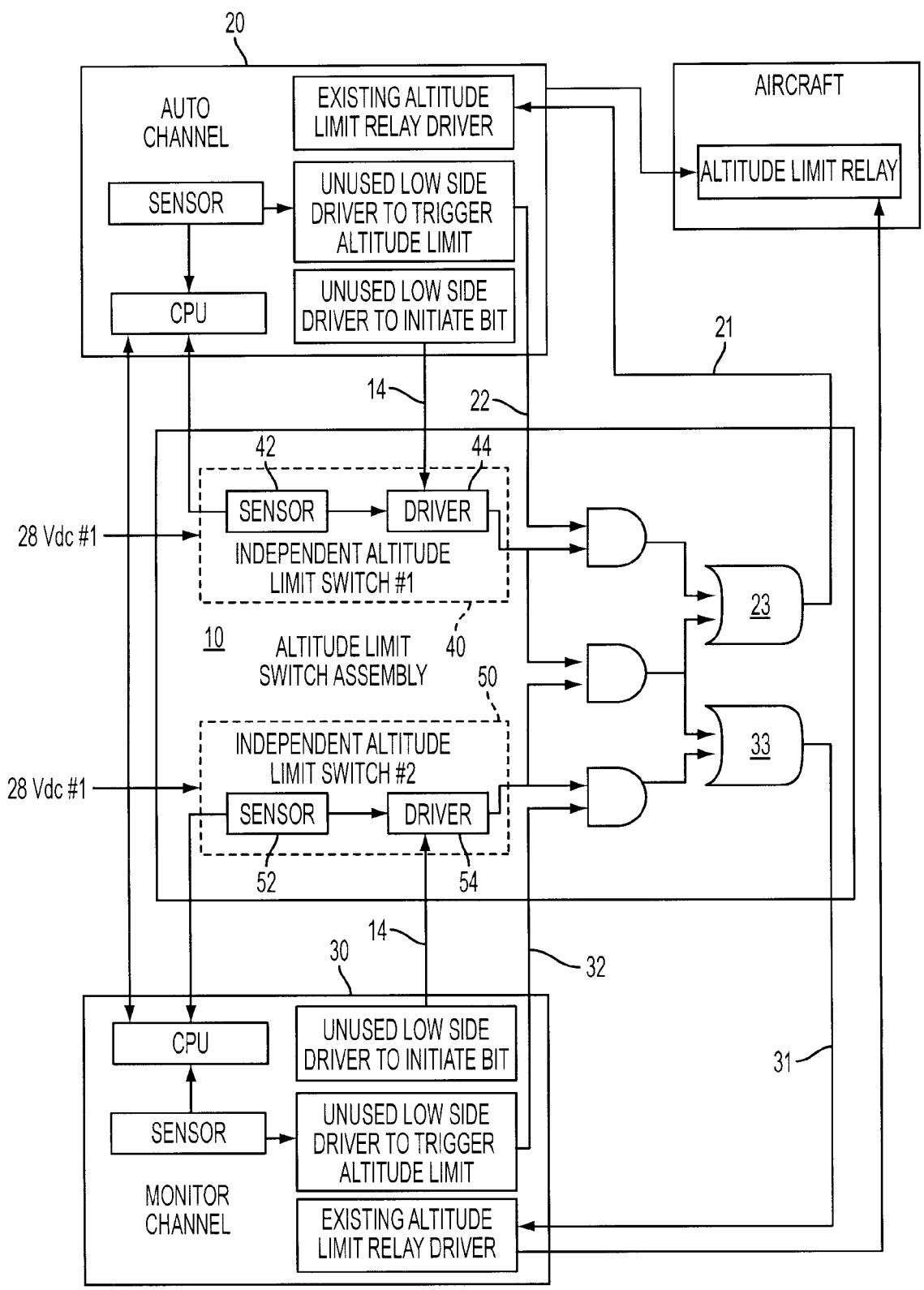
FIG. 2 is a block diagram of the assembly of the present invention.

Referring now to FIG. 2, the assembly 10 may incorporate a first independent limit switch 40 and a second independent limit switch 50. Assembly 10 may receive two isolated inputs 14, for example, from an auto channel 20 and from a monitor channel 30 for initiating built in test of the assembly. The two limit switches 40, 50 of assembly 10 and the auto and monitor channels 20, 30 may be electronic pressure sensors that measure cabin pressure. The auto channel 20 and the monitor channel 30 may detect high altitude or low cabin pressure and close a first and a second switch respectively. If either a first switch is closed by the auto channel 20 or a second switch is closed by monitor channel 30, then an outflow valve regulating cabin pressure may close.

Although each of the four pressure sensor limit switches 20, 30, 40, 50 may have an analog output, such as a variable voltage output from the pressure sensor to an analog and digital port, circuitry associated with each limit switch 20, 30, 40, 50 may be fed into a microprocessor or other electronic circuit in accordance with a logic function to determine the output of the overall assembly 10.

As seen from the block diagram of FIG. 2, input 22 of the auto channel 20 and input 32 of the monitor channel 30 may provide two discrete input signals to the altitude limit switch assembly 1 0. First independent limit switch 40 may have a pressure sensor 42 and may have a driver 44. Similarly, second independent limit switch 50 may also have a pressure sensor 52 and may have a driver 54. The pressure sensors 42, 52 may measure cabin pressure and adjust an outflow valve (not shown) of an aircraft accordingly via the drivers 44, 54. For example, when the pressure in the cabin of an aircraft falls below a certain value (or, in other words, when the cabin altitude exceeds a certain value), the drivers 44, 54 may act to close the outflow valve.

The analog output of first independent limit switch 40 and the analog output of second independent limit switch 50 may have a variable voltage. This variable voltage output may be an analog output that changes proportionately with pressure. The variable output may be used by the auto and monitor channel to determine if the two independent altitude limit switches are working properly.

A detailed circuit description incorporating the logic function shown in Table 1 is well known to those in the art. In Table 1, the assembly output column is defined as True when output 21 or OR gate 23 or output 31 of OR gate 33 is true. The assembly output column of Table 1 is defined as False when output 21 and output 31 are both false.

The below table, Table 1, shows the outputs of the four limit switches 20, 30, 40, 50 in relation to the output of altitude limit switch assembly 10 of the present invention. The numbers in the "Output" column identify the row numbers of Table 1 for ease of reference. In Table 1, the appearance of a "True" output under the columns for any of the limit switches indicates a result that the particular limit switch identified at the top of that column sensed the relevant condition, in this case sensed that the cabin pressure was below the set value, i.e. was too low, which also means that the limit switch sensed that the altitude was above a set altitude value, i.e. was too high. Conversely, the appearance in Table 1 of a "False" output in any of the columns for the limit switches indicates a result that a particular limit switch did not sense the condition, i.e. did not sense that the cabin pressure was below the set value, i.e. did not sense that it was too low, which also means that the limit switch did not sense that the altitude was above a set altitude value, i.e. did not sense that the altitude was too high. The "D" appearing adjacent to certain outputs indicates that the output in that box "does not matter", i.e., does not affect the output of assembly 10 since the output of assembly 10 was fixed and determined by other outputs irregardless of the output of that limit switch.

TABLE 1

| | Auto channel limit switch 20 | Monitor channel limit switch 30 | Independent limit switch #1 40 | Independent limit switch #2 50 | Assembly Output |
|---|---|---|---|---|---|
| 1 | False | False | False | False | False 1 |
| 2 | True | False | False | False | False 2 |
| 3 | False | True | False | False | False 3 |
| 4 | False | False | True | False | False 4 |
| 5 | False | False | False | True | False 5 |
| 6 | True | True | False | False | False 6 |
| 7 | True | False D | True | False D | True 7 |
| 8 | True | False | False | True | False 8 |
| 9 | False | True | True | False | False 9 |
| 10 | False D | True | False D | True | True 10 |
| 11 | False D | False D | True | True | True 11 |
| 12 | True | True D | True | False D | True 12 |
| 13 | False D | True D | True | True | True 13 |
| 14 | True D | False D | True | True | True 14 |
| 15 | True D | True | False D | True | True 15 |
| 16 | True D | True D | True | True | True 16 |

As can be seen from Table 1, the outputs from rows 7 and 8 differ—assembly 10 output is True for row 7 and False for row 8. This reflects the fact that in the embodiment shown in Table 1, first independent limit switch 40 may be electronically connected to auto channel 20 and second independent limit switch may be connected to monitor channel 30. Thus, the validity of Table 1 is based on a specific wiring or other electrical connection between a particular independent limit switch 40, 50 and either the auto channel or the monitor channel. However, in other embodiments, the electrical connection may vary. For example, first independent limit switch 40 may be electronically connected to monitor channel 30 and second independent limit switch may be electrically connected to auto channel 20.

The altitude limit switch assembly 10 may meet a mean time between failure of approximately 36,090 flight hours over temperatures and pressures specified by the environmental requirements. For example, the temperature requirements may include a range from approximately minus 40° C. to approximately 70° C.

In accordance with the present invention, the assembly may achieve a desirable failure probability so that incorrect actuation of the altitude limit switch assembly 10 occurs less frequently than once in 10 to the minus 9 times per flight hours. This may result in failure not occurring in the life of the aircraft.

Furthermore, each independent limit switch 40, 50 may themselves have a component reliability or failure rate that 1.0 times 10 to the minus 5.

Figure 3:
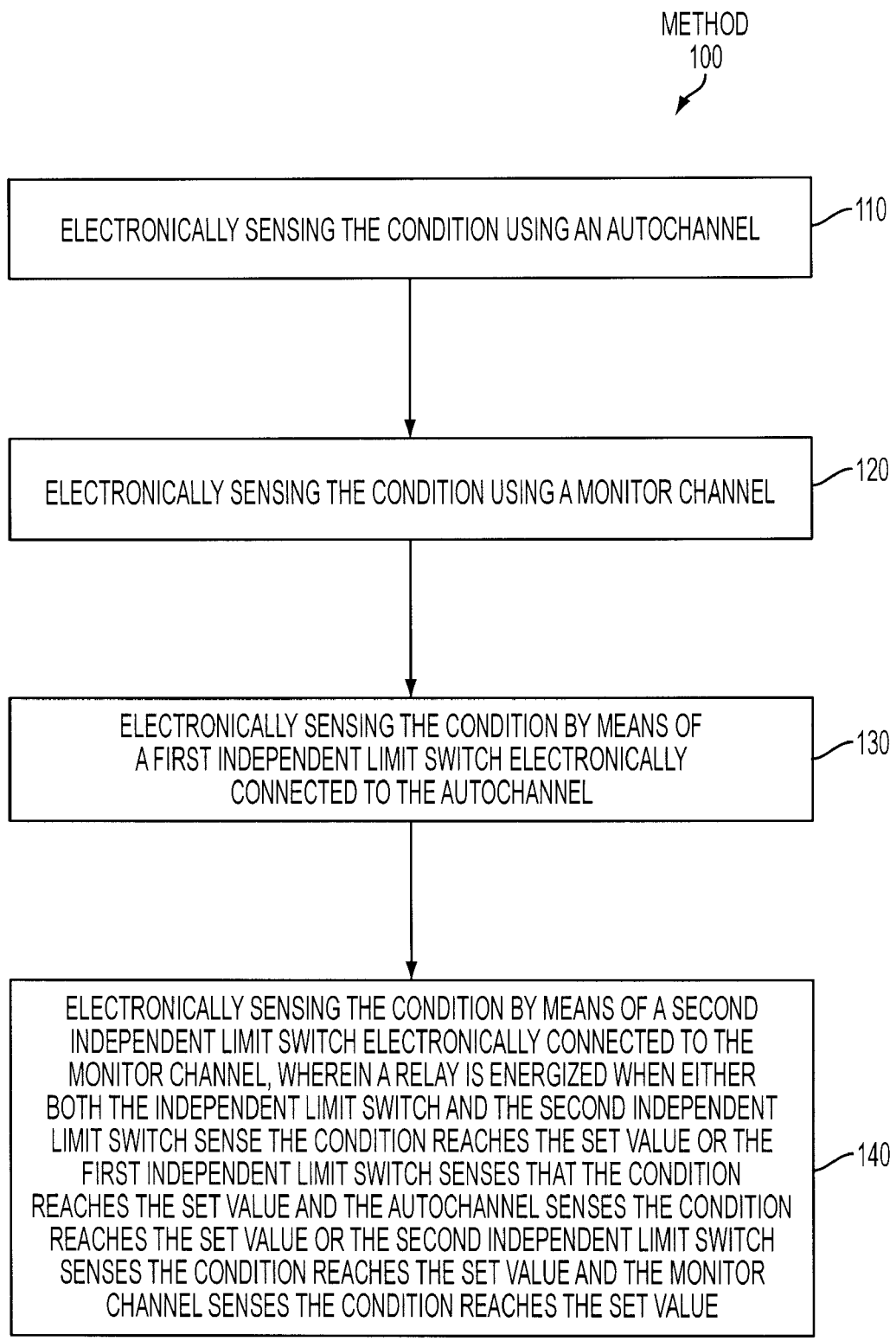
FIG. 3 is a flow chart showing a method of the present invention

As can be seen from FIG. 3, which is a flow chart, the present invention can also be expressed as a method 100 of monitoring a fail safe critical condition such as cabin pressure in an aircraft. Method 100 may include a step 110 of electronically sensing the condition using an auto channel such as switch 20. Method 100 may also include step 120 of electronically sensing the condition using a monitor channel such as switch 30. Method 100 may include a further step 130 of electronically sensing the condition by means of a first independent limit switch (such as switch 40) electronically connected to the auto channel and a still further step 140 of electronically sensing the condition by means of a second independent limit switch (such as switch 50) electronically connected to the monitor channel. In method 100, a relay is energized when either (i) both the first independent limit switch and the second independent limit switch sense that the condition reaches the set value, or (ii) the first independent limit switch senses that the condition reaches the set value and the auto channel senses that the condition reaches the set value, or (iii) the second independent limit switch senses that the condition reaches the set value and the monitor channel senses that the conditions reaches the set value.

It should be understood, of course, that the foregoing relates to exemplary embodiments of the invention and that modifications may be made without departing from the spirit and scope of the invention as set forth in the following claims.

We claim:

1. An assembly for detecting unacceptably low cabin pressure, comprising:
   an auto channel that closes a first switch upon sensing that a cabin pressure falls below a set value;
   a monitor channel that closes a second switch upon sensing that the cabin pressure falls below the set value;
   a first independent limit switch wired to the auto channel;
   a second independent limit switch wired to the monitor channel,
   wherein the assembly closes an outflow valve, the outflow valve closing when either
   (i) both the first independent limit switch and the second independent limit switch sense that the cabin pressure falls below the set value, or
   (ii) the first independent limit switch senses that the cabin pressure falls below the set value and the auto channel senses that the cabin pressure falls below the set value, or
   (iii) the second independent limit switch senses that the cabin pressure falls below the set value and the monitor channel senses that the cabin pressure falls below the set value.

2. The assembly of claim 1, wherein the cabin pressure is measured in a cabin of an aircraft.

3. The assembly of claim 2, wherein the first independent limit switch is of dissimilar design from the auto channel and from the monitor channel.

4. The assembly of claim 1, wherein the second independent limit switch is of dissimilar design from the auto channel limit switch and from the monitor limit switch.

5. The assembly of claim 1, wherein the assembly has a failure probability for closing the outflow valve of less than 0.000000001 failures per flight hour.

6. The assembly of claim 1, wherein each independent limit switch provides an analog output.

7. The assembly of claim 1, wherein each independent limit switch has a failure probability of less than 0.00005 failures per flight hour.

8. A method of monitoring a fail safe critical condition, comprising:
   electronically sensing the condition using an auto channel;
   electronically sensing the condition using a monitor channel;
   electronically sensing the condition by means of a first independent limit switch electronically connected to the auto channel;
   electronically sensing the condition by means of a second independent limit switch electronically connected to the monitor channel, wherein a relay is energized when either
   (i) both the first independent limit switch and the second independent limit switch sense that the condition reaches the set value, or
   (ii) the first independent limit switch senses that the condition reaches the set value and the auto channel senses that the condition reaches the set value, or
   (iii) the second independent limit switch senses that the condition reaches the set value and the monitor channel senses that the conditions reaches the set value.

9. The method of claim 8, further comprising having the auto channel close a first switch upon sensing that the set value of the condition is reached.

10. The method of claim 8, further comprising having the auto channel close a second switch upon sensing that the set value of the condition is reached.

11. The method of claim 8, wherein the failsafe critical condition is monitored without an aneroid barometer.

12. The method of claim 8, further comprising feeding analog outputs of the first and second independent limit switches into an electronic circuit to create a digital output that follows a pre-defined logic function.

13. A cabin altitude limit switch assembly, comprising:
   a first independent limit switch wired to one of either an auto channel or a monitor channel, the auto channel closing a first switch upon sensing that the cabin altitude exceeds a set value and the monitor channel closing a second switch upon sensing that the altitude exceeds the set value;
   a second independent limit switch wired to a different one of either the auto channel or the monitor channel, wherein the assembly energizes an altitude limit relay when both the first independent limit switch and the second independent limit switch sense that the altitude exceeds the set value, and
   wherein the assembly energizes the relay when one of the independent limit switches senses that the altitude exceeds the set value and either
   (i) the auto channel wired to that one of the independent limit switches senses that the altitude exceeds the set value or (ii) the monitor channel wired to that one of the independent limit switches senses that the altitude exceeds the set value.

14. The cabin altitude limit switch assembly of claim 12, wherein the assembly has a mean time between failure of approximately 36,090 flight hours.

15. The cabin altitude limit switch assembly of claim 12, wherein the first and second independent limit switches output analog signals in parallel with digital output to the auto channel and the monitor channel.

16. The cabin altitude limit switch assembly of claim 15, wherein analog signals are continuously monitored by the auto and monitor channels.

17. The cabin altitude limit switch assembly of claim 12, wherein the assembly operates over temperatures ranging between approximately minus 40° C. and approximately 70° C.

18. The cabin altitude limit switch assembly of claim 12, wherein the first independent limit switch is wired to the auto channel and the second independent limit switch is wired to the monitor channel.

19. The cabin altitude limit switch assembly of claim 12, wherein both of the independent limit switches has a failure probability of less than 10 to the minus 5.

* * * * *